(12) United States Patent
Harig

(10) Patent No.: US 12,020,422 B2
(45) Date of Patent: *Jun. 25, 2024

(54) METHODS AND APPARATUSES TO FACILITATE STRAIN MEASUREMENT IN TEXTILES

(71) Applicant: PUMA SE, Herzogenaurach (DE)

(72) Inventor: Christian Harig, Erlangen (DE)

(73) Assignee: PUMA SE, Herzogenaurach (DE)

(*) Notice: Subject to any disclaimer, the term of this patent is extended or adjusted under 35 U.S.C. 154(b) by 2 days.

This patent is subject to a terminal disclaimer.

(21) Appl. No.: 17/862,520

(22) Filed: Jul. 12, 2022

(65) Prior Publication Data

US 2022/0351355 A1 Nov. 3, 2022

Related U.S. Application Data

(63) Continuation of application No. 15/930,665, filed on May 13, 2020, now Pat. No. 11,386,547.

(51) Int. Cl.
*G01N 3/06* (2006.01)
*G06T 7/00* (2017.01)

(52) U.S. Cl.
CPC ............. *G06T 7/001* (2013.01); *G01N 3/068* (2013.01); *G06T 2207/10021* (2013.01); *G06T 2207/30124* (2013.01); *G06T 2207/30204* (2013.01)

(58) Field of Classification Search
CPC .......... G06T 7/001; G06T 2207/10021; G06T 2207/30124; G06T 2207/30204
USPC ................................................... 382/166, 100
See application file for complete search history.

(56) References Cited

U.S. PATENT DOCUMENTS

| | | | |
|---|---|---|---|
| 11,386,547 B2 * | 7/2022 | Harig | B33Y 80/00 |
| 2018/0084869 A1 * | 3/2018 | Raoufi | A43C 11/22 |
| 2018/0360156 A1 * | 12/2018 | Whiteman | A43B 23/0245 |

\* cited by examiner

*Primary Examiner* — Sheela C Chawan
(74) *Attorney, Agent, or Firm* — Quarles & Brady LLP

(57) ABSTRACT

A system for producing a textile component of an article includes an additive manufacturing device in selective communication with a processor and memory. The processor and memory are configured to determine a strain value in a region of the textile component of the article based on images of the article from a camera in selective communication with the processor and memory and to generate a strain map based on the strain value. The additive manufacturing device is configured to apply a reinforcement to a textile substrate to variably reinforce the textile substrate according to the strain map and to form the textile component of the article.

37 Claims, 16 Drawing Sheets

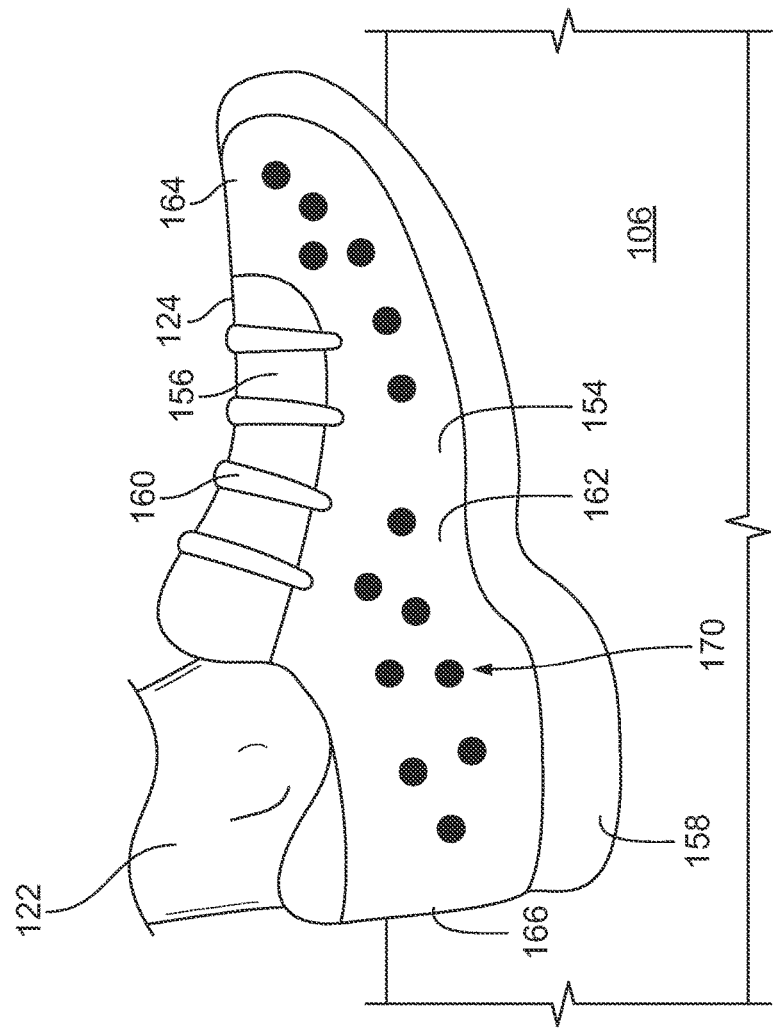
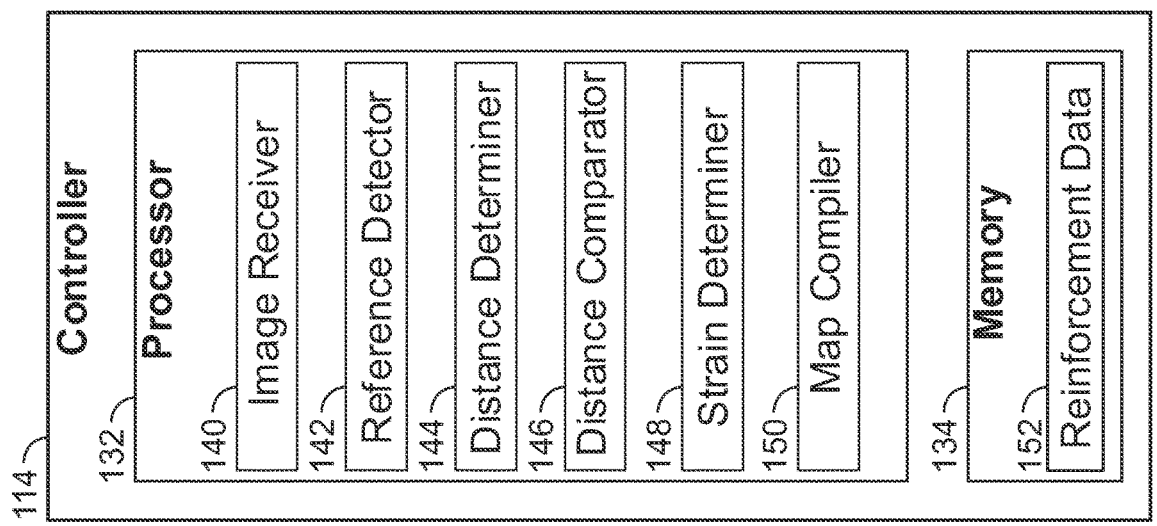

152

| Strain e (%) | | Reinforcement (mm) |
|---|---|---|
| at least | up to | |
| 1.5 | 3.25 | 0.5 |
| 3.25 | 5 | 1.0 |
| 5 | 6.75 | 1.5 |
| 6.75 | 8.5 | 2.0 |
| 8.5 | 10.25 | 2.5 |
| 10.25 | 12 | 3.0 |

METHODS AND APPARATUSES TO FACILITATE STRAIN MEASUREMENT IN TEXTILES

CROSS REFERENCE TO RELATED APPLICATIONS

The present application is a continuation of U.S. patent application Ser. No. 15/930,665, filed May 13, 2020, which is incorporated by reference herein in its entirety.

FIELD OF THE DISCLOSURE

Embodiments of the present disclosure generally relate to producing apparel and, more particularly, to methods and apparatuses to facilitate strain measurement in textiles.

BACKGROUND

In recent years, apparel has been developed to support athletes' bodies and to improve athletes' performance. For example, athletic shoes now often include elastomers. The elastomers work to cover, compress, and cushion athletes' feet.

Certain known elastomers are in textile form. When an athlete wears a shoe constructed of these elastomeric textiles, the elastomeric textiles conform to the athlete's foot. The elastomeric textiles further gently squeeze the athlete's foot to provide support to the foot. When the foot flexes, the elastomeric textiles flex with the foot.

However, these known elastomeric textiles are produced in a single, uniform layer. Thus, these known elastomeric textiles have a uniform spring rate and provide undifferentiated compression across the athlete's foot.

Therefore, a need exists for an elastomer that has varying spring rates to provide customized varying levels of compression and resiliency to athletes.

SUMMARY

In one aspect, a system to produce a textile component of an article is disclosed that includes an additive manufacturing device in selective communication with a processor and memory. The processor and the memory are configured to determine a strain value in a region of the textile component of the article based on images of the article from a camera in selective communication with the processor and memory, and to generate a strain map based on the strain value. The additive manufacturing device is configured to apply a reinforcement to a textile substrate to variably reinforce the textile substrate according to the strain map and to form the textile component of the article.

In one embodiment, the article can be a shoe and the textile component can be an upper of the shoe. In another embodiment, the textile substrate can be a pre-made structure having a shape of the upper of the shoe. In yet another embodiment, the textile substrate is formed of an elastomeric textile. In a different embodiment, the reinforcement is comprised of an elastomer.

In still another embodiment, the article can include first and second textile components. In yet another embodiment, the article can be a shoe, the first textile component can be an upper of the shoe, and the second textile component can be a tongue of the shoe. In such embodiments, the tongue can be connected to the upper and the upper can be connected to a sole of the shoe. In a different embodiment, the textile substrate can include first and second textile substrates of the first and second textile components, respectively. In such embodiments, the additive manufacturing device can be further configured to apply, according to the strain map, a first plurality of reinforcements to the first textile substrate to form the first textile component, and to apply, according to the strain map, a second plurality of reinforcements to the second substrate to form the second textile component. In such embodiments, the first textile substrate can be a first pre-made structure having a shape of an upper of a shoe and the second textile substrate can be a second pre-made structure having a shape of a tongue of the shoe. In such embodiments, the first textile substrate can include a plurality of lace holes. In one embodiment, the first textile substrate can include a seam flange. In another embodiment, the second textile substrate can include a lace holder.

In another aspect, a system to produce an article is disclosed that includes an additive manufacturing device in selective communication with a processor and memory. The processor and memory are configured to determine a strain value in a region of the article based on images of the article from a camera in selective communication with the processor and memory. The additive manufacturing device is configured to apply a reinforcement to an article substrate to variably reinforce at least the region of the article according to the strain values and to form the article.

In one embodiment, the article can be an article of clothing. In a different embodiment, the reinforcement can be comprised of an elastomer.

In another embodiment, the reinforcement can include a plurality of reinforcements applied to the article substrate. In such embodiments, at least two of the plurality of reinforcements can have a varying thickness relative to each other. In some embodiments, the thickness of each of the plurality of reinforcements can be in a range of about 0.5 millimeters to about 3.0 millimeters. In yet another embodiment, the plurality of reinforcements can be shaped as linear lines. In such embodiments, at least two of the plurality of reinforcements can have a varying length relative to each other. In still another embodiment, the plurality of reinforcements can be shaped as curved lines. In such embodiments, two or more of the plurality of reinforcements can intersect each other. In another embodiment, the plurality of reinforcements can be shaped as dots. In such embodiments, the plurality of reinforcements can each have a non-polygonal shape or a polygonal shape. In such embodiments, two or more of the plurality of reinforcements can have varying shapes and sizes relative to each other.

In yet another aspect, a method to produce an article is disclosed that includes applying, with an additive manufacturing device, a reinforcement to an article substrate to variably reinforce at least a region of the article according to one or more strain values, which can be determined based on images of the article, and to form the article.

In one embodiment, the reinforcement can have a varying thickness. In another embodiment, the reinforcement can include a plurality of reinforcements applied to the article substrate. In such embodiments, two or more of the plurality of reinforcements can have a varying thickness and a varying shape relative to each other.

In still another embodiment, the article can be a shoe and the article substrate can be an upper of the shoe. In yet another embodiment, the article can be an article of clothing and the article substrate can be a surface of the article of clothing.

In still yet another aspect, a non-transitory computer-readable medium is disclosed that stores instructions for an additive manufacturing device that, when executed by the additive manufacturing device, causes the additive manufacturing device to apply a reinforcement to a substrate of an article to variably reinforce at least a region of the article according to one or more strain values, which is determined based on images of the article, and to form the article.

In one embodiment, the article can be a shoe and the substrate can be an upper of the shoe. In another embodiment, the article can be an article of clothing and the substrate can be a surface of the article of clothing. In still another embodiment, the reinforcement is comprised of an elastomer.

BRIEF DESCRIPTION OF THE DRAWINGS

FIG. 3 is a block diagram of an example controller of the system of FIGS. 1 and 2;

FIG. 4 is a side view of an example shoe utilized with the system of FIGS. 1 and 2;

FIG. 9 illustrates a look-up table stored in a memory of the example controller of FIG. 3;

Figure 1:
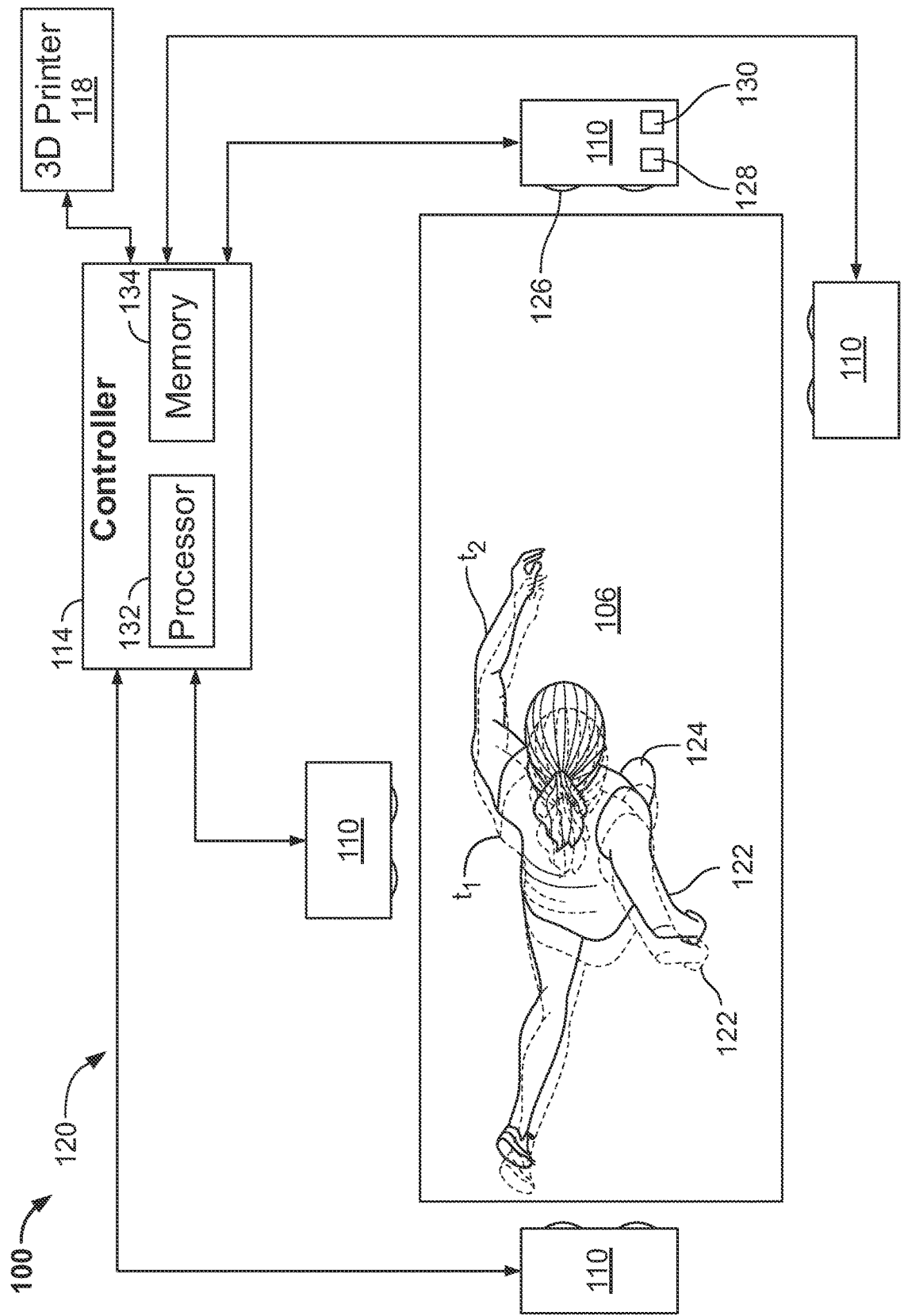
FIG. 1 is an overhead schematic view of a system according to an embodiment of the present disclosure.

Before the embodiments of the disclosure are explained in detail, it is to be understood that the disclosure is not limited in its application to the details of construction and the arrangement of the components set forth in the following description or illustrated in the drawings. The disclosure is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DETAILED DESCRIPTION

Embodiments of the present disclosure provide an example system that has features to facilitate producing an elastomer that has varying spring rates to provide customized varying levels of compression and resiliency. The example system includes cameras and a controller to measure deformation of an athlete's shoes when the athlete's feet exert forces on the shoes through movement (e.g., running, jumping, kicking, etc.). The controller generates a map of the deformation measurements. The map is provided to a three-dimensional (3D) printer of the system, which selectively applies an elastomer to shoe components according to the map. Thus, the shoe components are reinforced by the elastomer in a pattern that is customized to the athlete's feet. It should be understood that the system may be used in any type of application to measure deformation in a test article, generate a map, and reinforce components according to the map to produce a stiffened and/or customized article (e.g., clothing, structures, tools, machinery, etc.).

Figure 2:
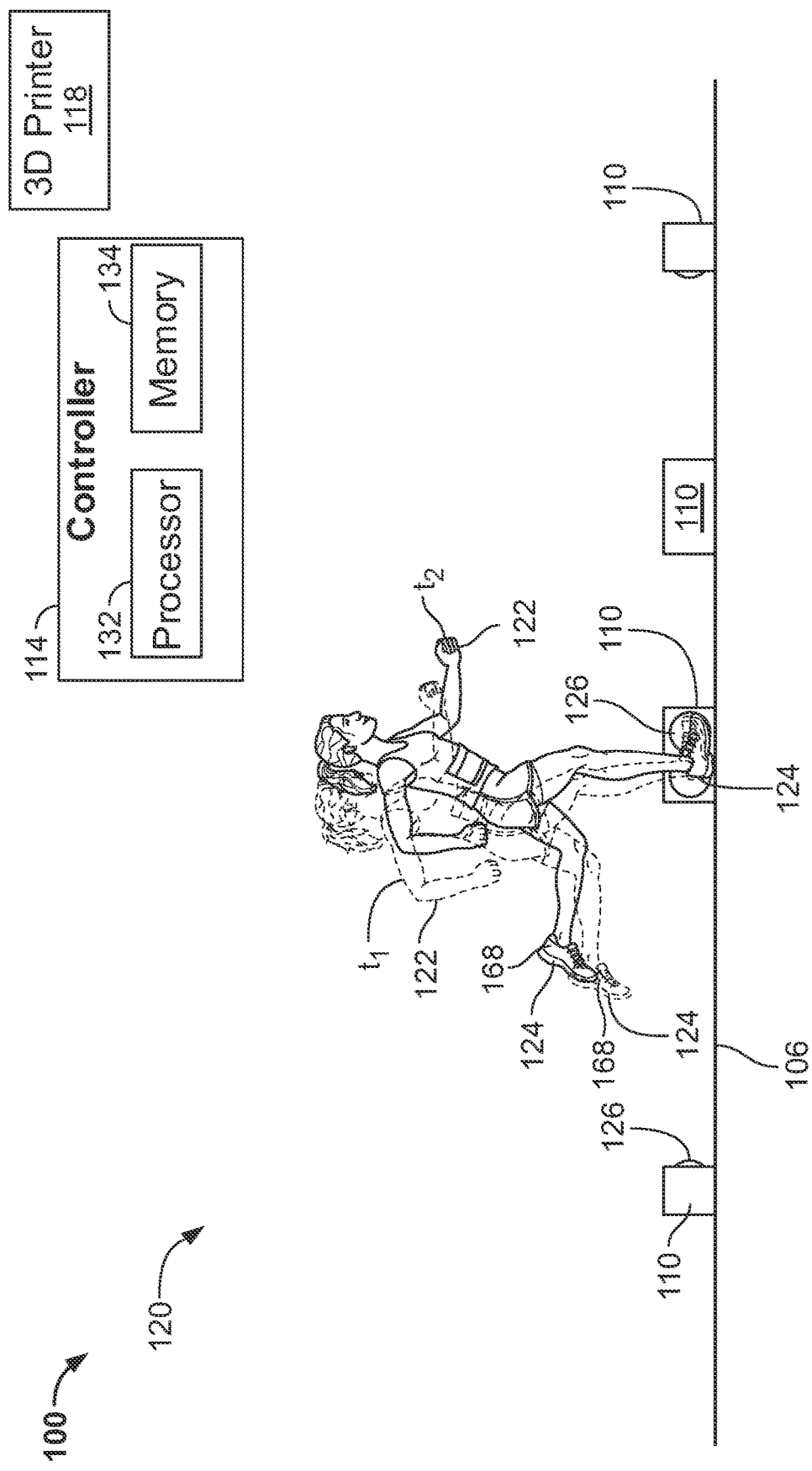
FIG. 2 is a side schematic view of the system of FIG. 1.

A system 100, according to an embodiment of the present disclosure is depicted in FIGS. 1 and 2. The system 100 includes a track 106, one or more cameras 110, a controller 114, and a 3D printer 118. In some embodiments, the track 106 and the cameras 110 are located at a testing facility 120 (e.g., a track, a gymnasium, a stadium, a retail location, etc.). In some embodiments, the controller 114 and/or the 3D printer 118 are also located at the testing facility 120. In some embodiments, the controller 114 and/or the 3D printer 118 are located remotely from the track 106 and the cameras 110. As an athlete 122 wearing reference shoes 124 moves along the track 106, the cameras 110 capture image data of the reference shoes 124, which is transmitted to the controller 114. The controller 114 analyzes the image data and instructs the 3D printer 118 to produce shoe components with varying levels of compression and resiliency that are customized to the athlete 122.

Still referring to FIGS. 1 and 2, in some instances, the athlete 122 may arrive at the testing facility 120 and be asked to move along the track 106 while wearing the reference shoes 124. More specifically, as the athlete 122 moves along the track 106, the athlete's 122 feet move within and relative to the reference shoes 124 (e.g., sliding, rolling, pronating, laterally, axially, etc.). Thus, the athlete's 122 feet exert forces on the reference shoes 124 to at least momentarily stretch and/or compress parts and/or regions of the reference shoes 124. This stretching and/or compression exerted on the reference shoes 124 may be measured as strain e, i.e., a change in length of an article as compared to an original length of the article, as will be explained in greater detail below. By capturing image data of the reference shoes 124 with the cameras 110 from multiple angles, the strain e values experienced across the various regions of the reference shoes 124 may be determined. Using these determined strain e values, a custom pair of shoes with regions having varying levels of reinforcement and/or elasticity may be produced for the athlete 122, as will be explained in greater detail below.

With continued reference to FIGS. 1 and 2, the athlete 122 is shown at a first time $t_1$ (in phantom) and at a second time $t_2$. The second time $t_2$ is after the first time $t_1$. It should be understood that the time period between $t_1$ and $t_2$ is relatively short (e.g., in a range between 0.4 millisecond and 5.0 milliseconds). Thus, the athlete 122 moves a relatively small distance along the track 106 during the time period between $t_1$ and $t_2$.

Still referring to FIGS. 1 and 2, in some embodiments, the track 106 is a substrate (e.g., a mat, a carpet, an artificial turf section, etc.) placed on the ground. In some embodiments, the track 106 is a predetermined area outlined on the ground (e.g., with paint, chalk, tape, etc.). In some embodiments, the track 106 is an elongated area between the cameras 110 for the athlete 122 to move and/or run along. In some embodiments, the track 106 is curvilinear. In some embodiments, the track 106 includes one or more corners (not shown).

Referring specifically to FIG. 1, each camera 110 includes one or more lenses 126, a processor 128, and a memory 130. Thus, in some embodiments, one or more of the cameras 110 is a stereoscopic camera. Further, in some embodiments, two single-lensed cameras 110 may be coupled together and/or arranged directly next to one another to produce a stereoscopic (e.g., three dimensional) image. The cameras 110 are arranged about the track 106 to collect image data from multiple views of the reference shoes 124 and the athlete 122. More specifically, the cameras 110 are located at opposing ends and alongside opposing sides of the track 106. Thus, the cameras 110 are located in front of, behind, and to the sides of the athlete 122. With reference specifically to FIG. 2, the cameras 110 are disposed low to the ground along the track 106 to capture image data of the reference shoes 124. It should be understood that the cameras 110 may be alternatively arranged to capture image data of any part and/or side of the athlete 122.

With continued reference to FIG. 1, the controller 114 is in communication with the cameras 110 and with the 3D printer 118. It should be understood that arrows indicating communication are omitted from FIG. 2 for clarity. The controller 114 includes a processor 132 and a memory 134. More specifically, the controller 114 may be in communication with the cameras 110 and with the 3D printer 118 via direct wired connections, a wired network, wirelessly, a wireless network, etc. Further, the controller 114 may be in selective communication with the cameras 110 and with the 3D printer 118. In other words, the controller 114 may be communicatively connected to the cameras 110 to receive image data and to the 3D printer 118 to transmit 3D printing instructions. Thus, in some embodiments, the controller 114 is remote from the cameras 110 and/or the 3D printer 118.

Still referring to FIG. 1, in some embodiments, the controller 114 is a programmable logic controller (PLC). Additionally, the processors 128, 132 may be any suitable processing device or set of processing devices such as, but not limited to, a microprocessor, a microcontroller-based platform, an integrated circuit, one or more field programmable gate arrays (FPGAs), and/or one or more application-specific integrated circuits (ASICs). The memories 130, 134 may be volatile memory (e.g., RAM including non-volatile RAM, magnetic RAM, ferroelectric RAM, etc.), non-volatile memory (e.g., disk memory, FLASH memory, EPROMs, EEPROMs, memristor-based non-volatile solid-state memory, etc.), unalterable memory (e.g., EPROMs), read-only memory, and/or high-capacity storage devices (e.g., hard drives, solid state drives, etc.). In some examples, the memories 130, 134 includes multiple kinds of memory, particularly volatile memory and non-volatile memory.

The memories 130, 134 are computer readable media on which one or more sets of instructions, such as the software for operating the methods of the present disclosure, can be embedded. The instructions may embody one or more of the methods or logic as described herein. For example, the instructions reside completely, or at least partially, within any one or more of the memories 130, 134, the computer readable medium, and/or within the processors 128, 132 during execution of the instructions.

The terms "non-transitory computer-readable medium" and "computer-readable medium" include a single medium or multiple media, such as a centralized or distributed database, and/or associated caches and servers that store one or more sets of instructions. Further, the terms "non-transitory computer-readable medium" and "computer-readable medium" include any tangible medium that is capable of storing, encoding or carrying a set of instructions for execution by a processor or that cause a system to perform any one or more of the methods or operations disclosed herein. As used herein, the term "computer readable medium" is expressly defined to include any type of computer readable storage device and/or storage disk and to exclude propagating signals.

Referring again to FIGS. 1 and 2, the 3D printer 118 is an additive manufacturing device. Additive manufacturing is also often referred to as 3D-printing. Products made via additive manufacturing are often referred to as additively manufactured and/or 3D-printed. As used herein, the terms "additive manufacturing," "3D-printing," "3D printing," and the like are equivalent to one another. The 3D printer 118 is configured to extrude and/or deposit subsequent layers of polymers and/or elastomers (e.g., plastic, silicone, artificial rubber, etc.) to produce a predetermined shape. The predetermined shape is provided by the controller 114.

Referring now to FIG. 3, the processor 132 is structured to include an image receiver 140, a reference detector 142, a distance determiner 144, a distance comparator 146, a strain determiner 148, and a map compiler 150. The memory 134 stores reinforcement data 152.

With reference now to FIG. 4, the reference shoe 124 includes an upper 154, a tongue 156, a sole 158, and laces 160. The upper 154 includes a lateral section 162, a front section 164, a rear section 166, and a medial section 168 (shown via the left reference shoe 124 of the athlete 122 in FIG. 2). As shown in FIG. 4, the front section 164 is opposite the rear section 166, and the lateral section 162 is opposite the medial section 168 (shown in FIG. 2). Additionally, the upper 154 features a plurality of reference marks 170. In some embodiments, the plurality of reference marks 170 are arranged in a decorative pattern. In some embodiments, the plurality of reference marks 170 are spread randomly across the reference shoe 124. In some embodiments, the upper 154 is a substrate and the plurality of reference marks 170 are attached to the upper 154 (e.g., printed, embroidered, adhered, fastened, etc.). In some embodiments, the plurality of reference marks 170 are a pattern within the upper 154 (e.g., woven, knitted, crocheted, etc.).

Figure 4A:
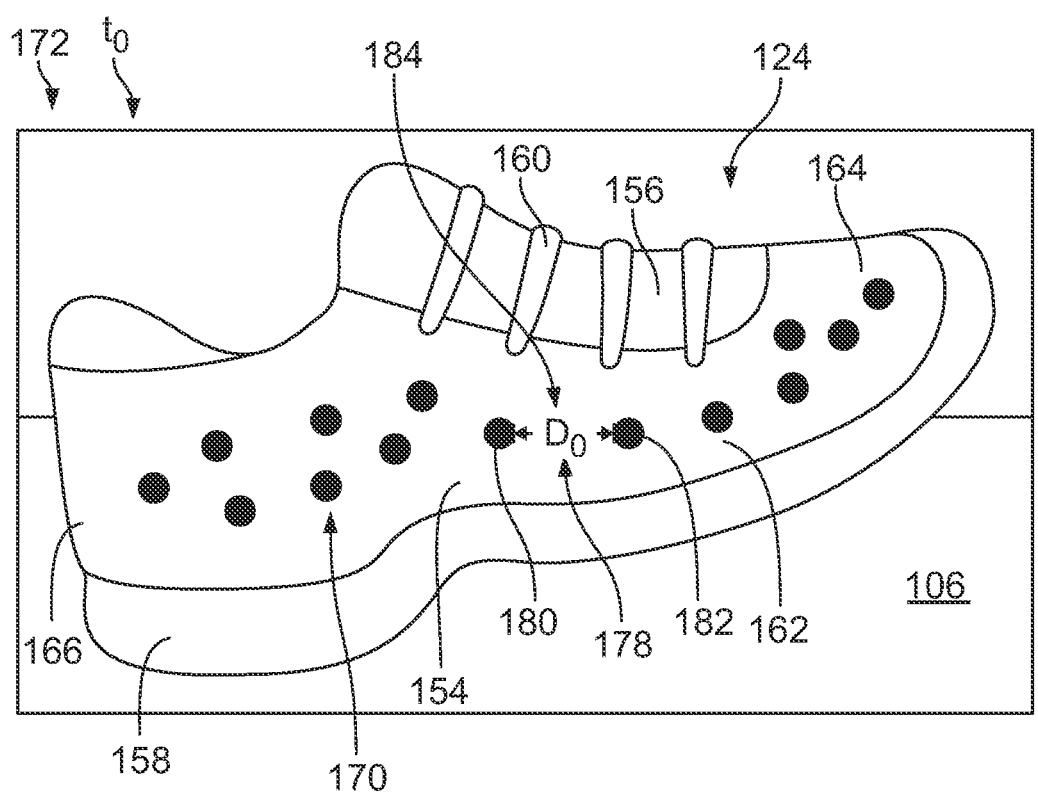
FIG. 4A is an example calibration image captured by the system of FIGS. 1 and 2.

Referring now to FIG. 4A, a calibration image 172 taken by the cameras 110 shows the reference shoe 124 under no load and/or constraint. The calibration image 172 is taken at a calibration time to. In some instances, the calibration time to is before the first time $t_1$. In some instances, the calibration time to is after the first time $t_1$. In some instances, the calibration time to is after the second time $t_2$. In the illustrated example of FIG. 4A, the calibration image 172 is primarily directed to the lateral section 162. In some instances, the calibration image 172 is a stereoscopic image.

Figure 5:
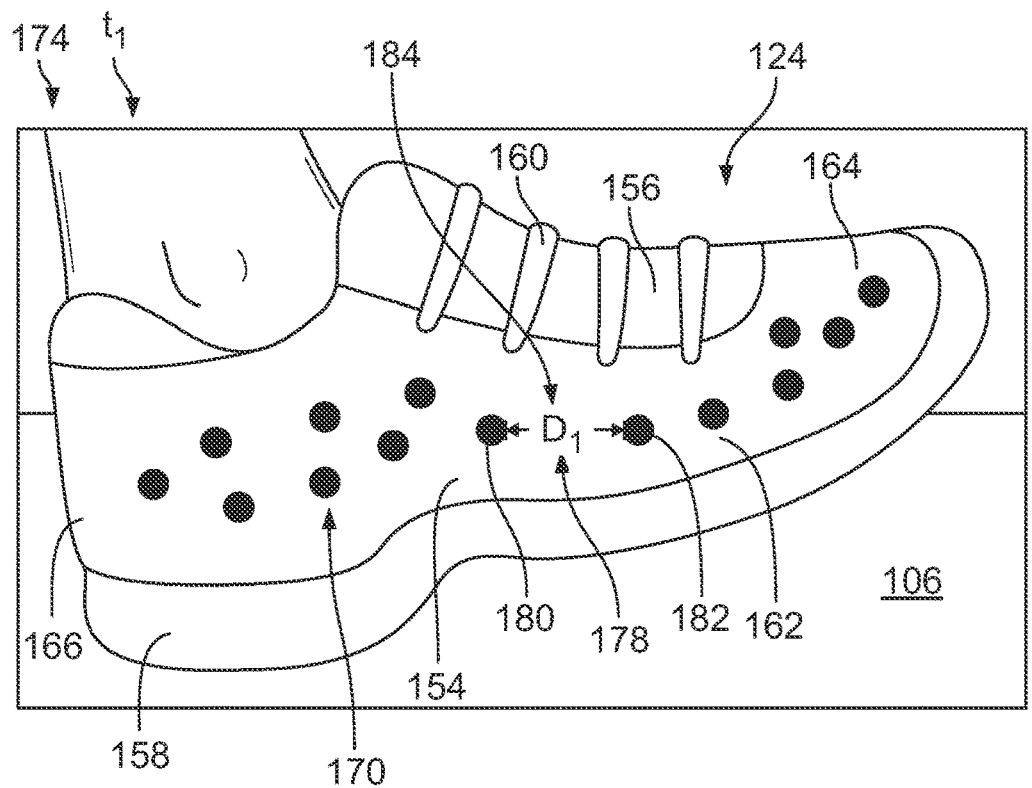
FIG. 5 is an example first image captured by the system of FIGS. 1 and 2.

With reference now to FIG. 5, a first image 174 taken by the cameras 110 shows the reference shoe 124 at the first time $t_1$. In the illustrated example of FIG. 5, the first image 174 is primarily directed to the lateral section 162. In some instances, the first image 174 is a stereoscopic image. Similarly, with reference now to FIG. 6, a second image 176 taken by the cameras 110 shows the reference shoe 124 at the second time $t_2$. In the illustrated example of FIG. 6, the second image 176 is also primarily directed to the lateral section 162. In some instances, the second image 176 is a stereoscopic image. As will be explained in greater detail below, the calibration image 172, the first image 174, and/or the second image 176 are analyzed to determine strain exerted on the lateral section 162 by the athlete 122.

With reference again to FIGS. 4A, 5, and 6, it should be understood that the cameras 110 (shown in FIGS. 1 and 2) may take additional images (not shown) of the reference shoe 124 directed toward the front section 164, the rear section 166, and/or the medial section 168 (shown in FIG. 2) as the athlete 122 moves along the track 106. The sampling rate at which the cameras 110 take these images is relatively fast (e.g., in a range between 200 samples per second and 2500 samples per second). In some instances, these additional images may be taken at the first time $t_1$ and/or the second time $t_2$. In some instances, these additional images may be taken at times differing from the first time $t_1$ and/or the second time $t_2$. It should be further understood that these additional images may be analyzed in the same manner as the calibration image 172, the first image 174, and/or the second image 176 to determine strain exerted on the front section 164, the rear section 166, and/or the medial section 168 by the athlete 122.

Figure 6:
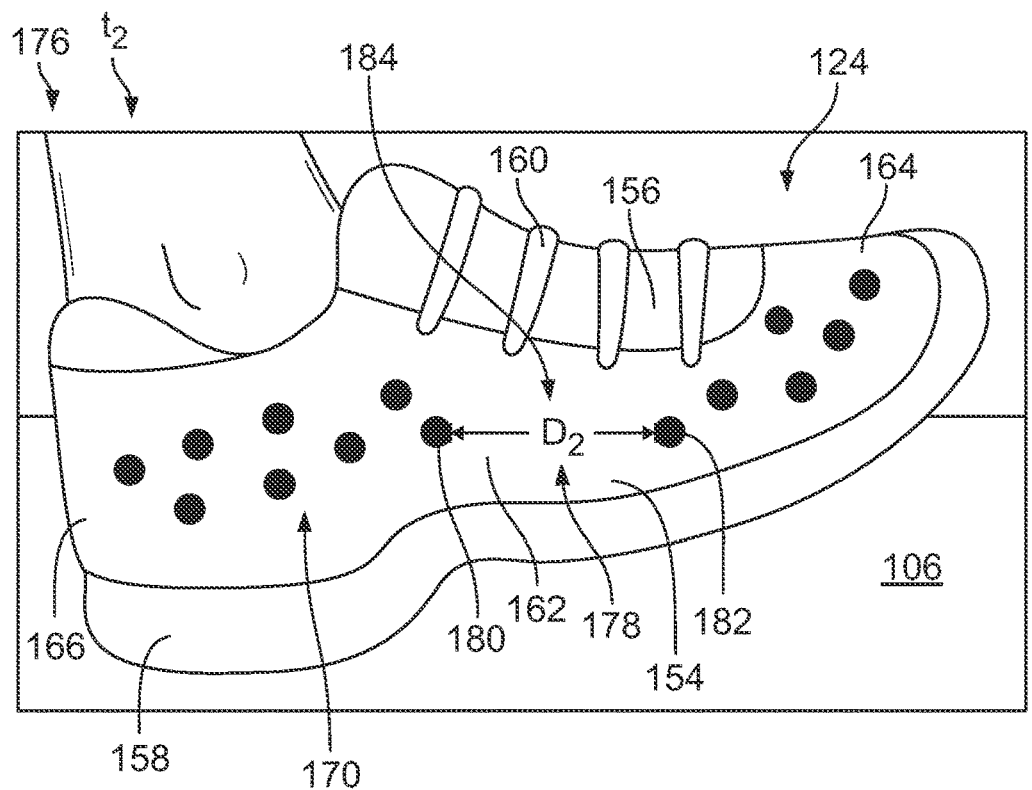
FIG. 6 is an example second image captured by the system of FIGS. 1 and 2.

With continued reference to FIGS. 4A, 5, and 6, the plurality of reference marks 170 define a plurality of regions 178 between neighboring reference marks 170. For example, a first reference mark 180 neighbors a second reference mark 182. Thus, the plurality of reference marks 170 includes a plurality of neighboring reference mark sets 184. For example, the first reference mark 180 and the second reference mark 182 form one of the plurality of neighboring reference mark sets 184. In other words, each region 178 is defined by one of the plurality of neighboring reference mark sets 184. It should be understood that each reference mark 170 may be part of multiple neighboring reference mark sets 184.

With reference again to FIG. 4A, at the calibration time $t_0$, the first reference mark 180 is separated from the second reference mark 182 by a reference distance $D_0$ across the region 178. With reference again to FIG. 5, at the first time $t_1$, the first reference mark 180 is separated from the second reference mark 182 by a first distance $D_1$ across the region 178. With reference again to FIG. 6, at the second time $t_2$, the first reference mark 180 is separated from the second reference mark 182 by a second distance $D_2$ across the region 178. In the illustrated examples of FIGS. 4A, 5, and 6, $D_1$ is longer than $D_0$ and $D_2$ is longer than $D_1$. Thus, in the examples of FIGS. 4A and 5, the foot of the athlete 122 moves laterally outwardly relative to the sole 158 against the region 178 to stretch the upper 154 from the reference distance $D_0$ (shown in FIG. 4A) to the first distance $D_1$ (shown in FIG. 5). In other words, the region 178 stretches by the difference between the reference distance $D_0$ and the first distance $D_1$ under outward lateral pressure exerted by the foot of the athlete 122. It should be understood that, depending on the movements of the athlete 122 (shown in FIGS. 1, 2, and 4), $D_1$ may be shorter than or equal to $D_0$. When $D_1$ is shorter than $D_0$, the region 178 is compressed. When $D_1$ is equal to $D_0$, no net forces are acting on the region 178.

Further, in the example of FIGS. 5 and 6, during the time period from the first time $t_1$ to the second time $t_2$, the foot of the athlete 122 moves laterally outwardly relative to the sole 158 against the region 178 to stretch the upper 154 from the first distance $D_1$ (shown in FIG. 5) to the second distance $D_2$ (shown in FIG. 6). In other words, the region 178 stretches by the difference between the first distance $D_1$ and the second distance $D_2$ under outward lateral pressure exerted by the foot of the athlete 122. It should be understood that, depending on the movements of the athlete 122 (shown in FIGS. 1, 2, and 4), $D_2$ may be shorter than or equal to $D_1$. When $D_2$ is shorter than $D_1$, the region 178 is compressed during the time period from the first time $t_1$ to the second time $t_2$. When $D_2$ is equal to $D_1$, no net forces have acted on the region 178 during the time period from the first time $t_1$ to the second time $t_2$.

With reference again to FIGS. 1, 2, and 3, in operation, the controller 114 receives the calibration image 172 (shown in FIG. 4A), the first image 174 (shown in FIG. 5), and/or the second image 176 (shown in FIG. 6) from the cameras 110. In other words, in operation, the controller 114 receives the calibration image 172 (shown in FIG. 4A) and one or more of the time-separated pair of images directed to the lateral section 162 (shown in FIGS. 4, 5, and 6) from the cameras 110. It should be understood that the controller 114 additionally receives calibration images and time-separated pairs of images directed to the front section 164 (shown in FIGS. 4, 5, and 6), the rear section 166 (shown in FIGS. 4, 5, and 6), and the medial section 168 (shown in FIG. 2) from the cameras 110. Further in operation, the controller 114 analyzes the received calibration images (e.g., the calibration image 172) and time-separated pairs of images (e.g., the first image 174 and the second image 176) to generate a strain map 186 (shown in FIG. 7), as will be explained in greater detail below.

Figure 7:
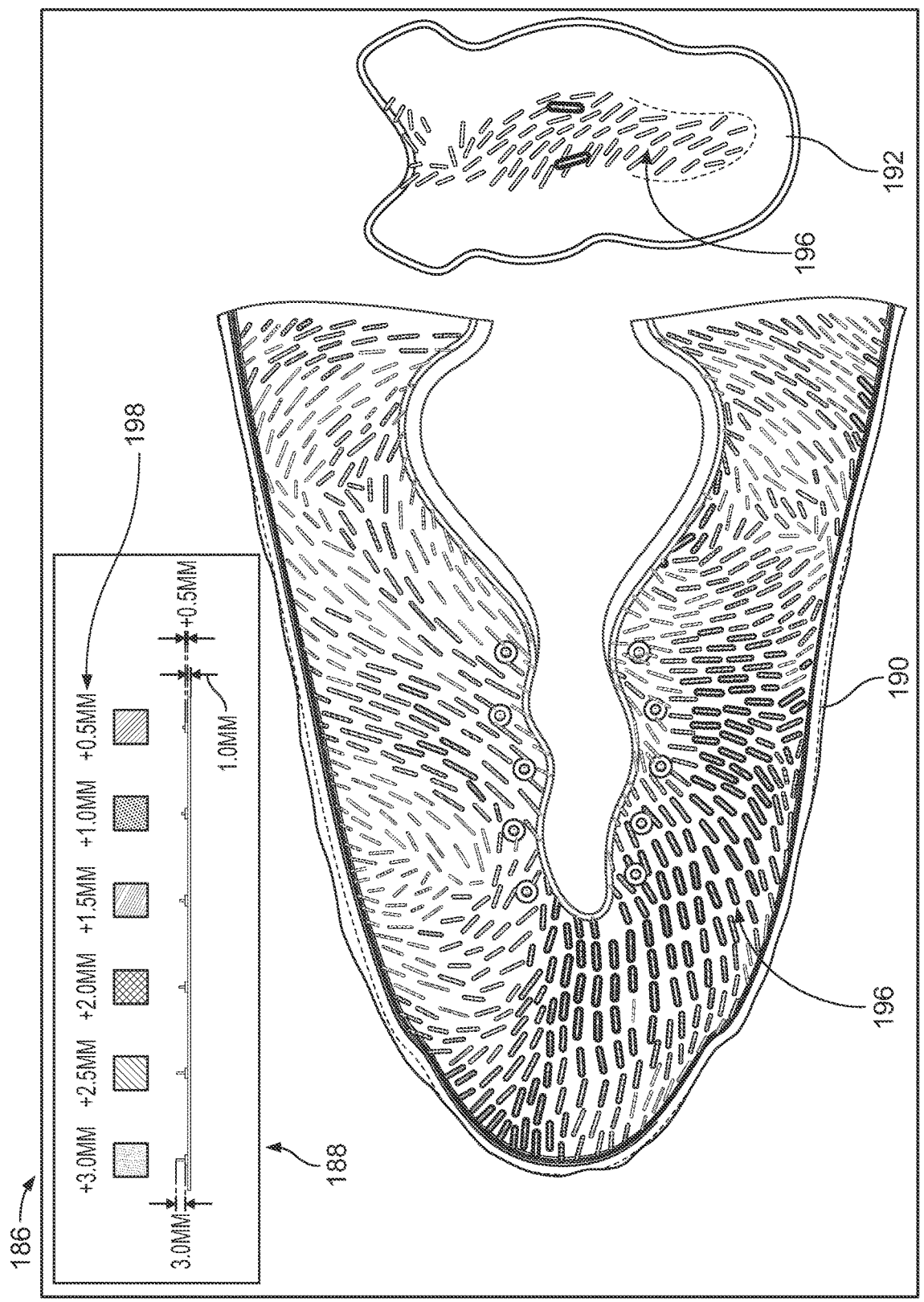
FIG. 7 is an example reinforcement map generated by the system of FIGS. 1 and 2.

Referring now to FIG. 7, the strain map 186 includes a legend 188, an upper guide 190, a tongue guide 192, strain indicators 196, and reinforcement thickness values 198. The strain indicators 196 are distributed across the upper guide 190 and the tongue guide 192 according to the analysis of the first image 174 and the second image 176. The strain indicators 196 are graphical representations of mechanical strain e experienced by the upper 154 (shown in FIG. 4) and/or the tongue 156 while the athlete 122 (shown in FIGS. 1, 2, and 4) moved along the track 106. The legend 188 correlates the graphical representation of the strain indicators 196 to the reinforcement thickness values 198. More specifically, strain e is described by Equation 1, below:

$$e = \frac{D_1 - D_0}{D_0} \qquad \text{Equation 1}$$

Thus, in Equation 1, strain e is the ratio of the change in length between the reference distance $D_0$ (shown in FIG. 4A) and the first distance $D_1$ (shown in FIG. 5) as compared to the reference distance $D_0$. It should be appreciated that because $D_0$ and $D_1$ both have units of length (e.g., millimeters and/or inches), strain e is unitless. Strain e is often described in terms of percentage.

In some instances, strain e is described by Equation 2, below:

$$e = \frac{D_2 - D_1}{D_1} \qquad \text{Equation 2}$$

Thus, in Equation 2, strain e is the ratio of the change in length between the first distance $D_1$ (shown in FIG. 5) and the second distance $D_2$ (shown in FIG. 6) as compared to the first distance $D_1$.

Figure 8:
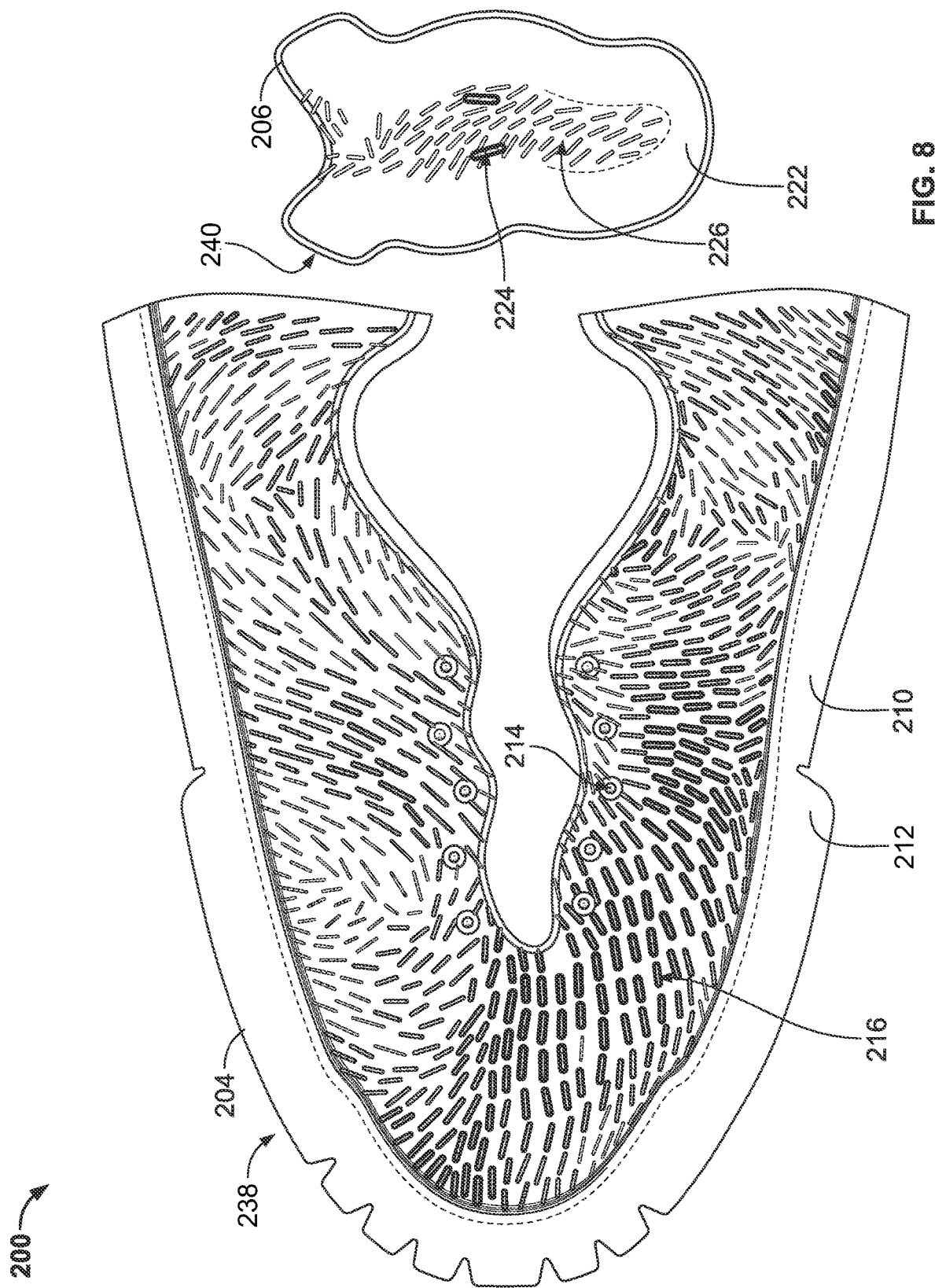
FIG. 8 illustrates a first example upper and an example tongue produced by the system of FIGS. 1 and 2.

With reference now to FIG. 8, shoe components 200 include a first example upper blank 204 and a tongue blank 206. The upper blank 204 includes a first substrate 210, which has a seam flange 212 and defines lace holes 214. The upper blank 204 is a pre-made structure ready for 3D printing. In some embodiments, the first substrate 210 is formed of an elastomeric textile. The upper blank 204 further includes a first plurality of reinforcements 216 applied to the first substrate 210 by the 3D printer 118 (shown in FIGS. 1 and 2) according to the strain map 186 (shown in FIG. 7), as will be explained in greater detail below. The tongue blank 206 includes a second substrate 222, which defines a lace holder 224. The tongue blank 206 is also a pre-made structure ready for 3D printing. The tongue blank 206 further includes a second plurality of reinforcements 226 applied to the second substrate 222 by the 3D printer 118 according to the strain map 186, as will also be explained in greater detail below. In some embodiments, the first plurality of reinforcements 216 and/or the second plurality of reinforcements 226 are resilient and/or are composed of an elastomer. In the example of FIG. 8, the first plurality of reinforcements 216 and the second plurality of reinforcements 226 are shaped as a plurality of dashes.

Referring now to FIG. 9, in some embodiments, the reinforcement data 152 is organized as a look-up table. The reinforcement data 152 includes strain value ranges 234 and the reinforcement thickness values 198. The reinforcement data 152 correlates the strain value ranges 234 to the reinforcement thickness values 198.

With reference again to FIG. 3, in operation, the image receiver 140 receives the calibration image 172 (shown in FIG. 4A), the first image 174 (shown in FIG. 5), and the second image 176 (shown in FIG. 6) from the cameras 110. In some embodiments, the cameras 110 send image data to the controller 114 as the image data is produced. Thus, in some embodiments, the controller 114 receives the second image 176 after the first image 174. Further, in some embodiments, the controller 114 receives the first image 174 after the calibration image 172. In some embodiments, the controller 114 receives the calibration image 172, the first image 174, and the second image 176 generally simultaneously.

With continued reference to FIG. 3, in operation, the reference detector 142 detects the plurality of reference marks 170 (shown in FIGS. 4A, 5, and 6) in the calibration image 172, the first image 174, and/or in the second image 176. More specifically, the reference detector 142 detects neighboring reference mark sets 184 visible in the calibration image 172, the first image 174, and/or in the second image 176. For example, the reference detector 142 detects the first reference mark 180 and the second reference mark 182. The reference detector 142 detects the plurality of reference marks 170 (e.g., the first reference mark 180 and the second reference mark 182) via one or more of edge detection, contrast differentiation, pattern recognition, etc.

Still referring to FIG. 3, in operation, the distance determiner 144 determines distances between reference marks 170 in neighboring reference mark sets 184 in the first image 174 (shown in FIG. 5) and in the second image 176 (shown in FIG. 6). In other words, the distance determiner 144 determines distances across the regions 178 in the first image 174 and in the second image 176. For example, the distance determiner 144 determines the reference distance $D_0$ (shown in FIG. 4A) between the first reference mark 180 and the second reference mark 182 in the calibration image 172. Additionally, the distance determiner 144 determines the first distance $D_1$ (shown in FIG. 5) between the first reference mark 180 and the second reference mark 182 in the first image 174. Further, for example, the distance determiner 144 determines the second distance $D_2$ (shown in FIG. 6) between the first reference mark 180 and the second reference mark 182 in the second image 176.

With continued reference to FIG. 3, in operation, the distance comparator 146 compares the distances between reference marks 170 in neighboring reference mark sets 184 determined from the first image 174 (shown in FIG. 5) and the second image 176 (shown in FIG. 6). In other words, the distance comparator 146 compares the distances across the regions 178 found from the calibration image 172 (shown in FIG. 4A), the first image 174, and/or the second image 176. For example, the distance comparator 146 compares the reference distance $D_0$ (shown in FIG. 4A) to the first distance $D_1$ (shown in FIG. 5). As another example, the distance comparator 146 compares the reference distance $D_0$ to the second distance Dz (shown in FIG. 6). In a further example, the distance comparator 146 compares the first distance $D_1$ to the second distance Dz. Further, the distance comparator 146 determines differences between the distances determined from the calibration image 172, the first image 174, and/or the second image 176. In other words, the distance comparator 146 determines distance differences corresponding to each neighboring reference mark set 184. For example, the distance comparator 146 determines a difference between the reference distance $D_0$ and the first distance $D_1$. As another example, the distance comparator 146 determines a difference between the reference distance $D_0$ and the second distance Dz. In a further example, the distance comparator 146 determines a difference between the first distance $D_1$ and the second distance Dz.

With reference still to FIG. 3, in operation, the strain determiner 148 determines strain values e corresponding to each region 178 based on the determined distance differences and the distances found in the first image 174 (shown in FIG. 5) according to Equation 1 and/or Equation 2, above. For example, the strain determiner 148 determines a strain value e from the difference between the reference distance $D_0$ (shown in FIG. 4A) and the first distance $D_1$ (shown in FIG. 5) as compared to the reference distance $D_0$ according to Equation 1. In another example, the strain determiner 148 determines a strain value e from the difference between the first distance $D_1$ and the second distance $D_2$ (shown in FIG. 6) as compared to the first distance $D_1$ according to Equation 2.

With continued reference to FIG. 3, it should be understood that the image receiver 140, the reference detector 142, the distance determiner 144, the distance comparator 146, and the strain determiner 148 receive, process, and analyze the time-separated pairs of images directed to the front section 164 (shown in FIGS. 4, 5, and 6), the rear section 166 (shown in FIGS. 4, 5, and 6), and/or the medial section 168 (shown in FIG. 2) in the same manner as the calibration image 172, the first image 174, and the second image 176. Thus, the controller 114 generates strain values e for the lateral section 162, the front section 164, the rear section 166, and/or the medial section 168. In other words, the controller 114 generates strain values e for some or all portions of the reference shoe 124 using image data from the cameras 110 (shown in FIG. 1).

Still referring to FIG. 3, in operation, the map compiler 150 compiles and graphically represents the strain values e to generate the strain map 186 (shown in FIG. 7). More specifically, the map compiler 150 positions the strain indicators 196 on the strain map 186 corresponding to the regions 178 (shown in FIGS. 5 and 6). Additionally, the map compiler 150 accesses the reinforcement data 152 (shown in FIGS. 3 and 9) and assigns one of reinforcement thickness values 198 to each strain indicator 196 according to the corresponding strain values e for each region 178. Further, the map compiler 150 codes the strain indicators 196 according to the corresponding strain values e and/or reinforcement thickness values 198 (e.g., by color, numeral tags, vector arrows, thickness, pattern, etc.). Thus, referring again to FIG. 7, the strain indicators 196 are mapped onto the upper guide 190 and the tongue guide 192 according to the strain values e for each region 178. Continuing in operation, the map compiler 150 sends the generated strain map 186 to the 3D printer 118.

With reference again to FIG. 8, the 3D printer 118 (shown in FIGS. 1 and 2) produces the shoe components 200. More specifically, the 3D printer 118 extrudes and/or deposits the first plurality of reinforcements 216 directly onto the first substrate 210 according to the positions and reinforcement thickness values 198 indicated by the strain map 186 (shown in FIG. 7) to produce a customized upper 238. Additionally, the 3D printer 118 extrudes and/or deposits the second plurality of reinforcements 226 directly onto the second substrate 222 according to the positions and reinforcement thickness values 198 indicated by the strain map 186 to produce a customized tongue 240. In some embodiments, the first plurality of reinforcements 216 and/or the second plurality of reinforcements 226 are composed of an elastomer. Thus, the first substrate 210 is variably reinforced and/or stiffened by the first plurality of reinforcements 216. Similarly, the second substrate 222 is variably reinforced and/or stiffened by the second plurality of reinforcements 226. Thus, the shoe components 200 are customized to the athlete 122.

Figure 11:
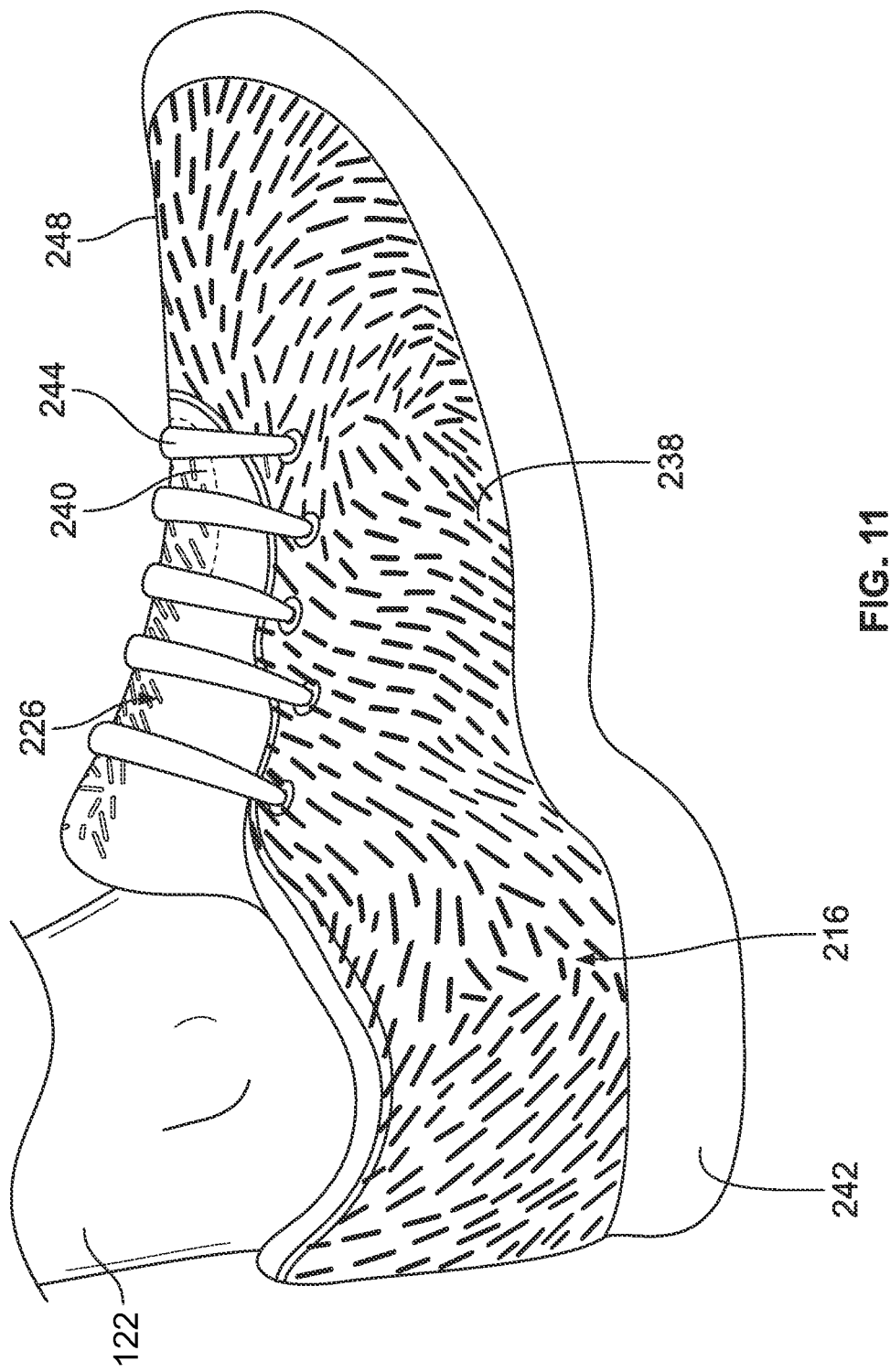
FIG. 11 is a side view of an example customized shoe produced using the system of FIGS. 1 and 2.

Referring now to FIG. 11, once the first plurality of reinforcements 216 and the second plurality of reinforcements 226 are cured (e.g., by the 3D printer 118), the shoe components 200 may be utilized with a sole 242 and laces 244 to construct a customized shoe 248 specifically for the athlete 122. More specifically, the customized upper 238 may be connected to the customized tongue 240 (e.g., stitched, adhered, welded, etc.) and further connected to the sole 242.

Figure 12:
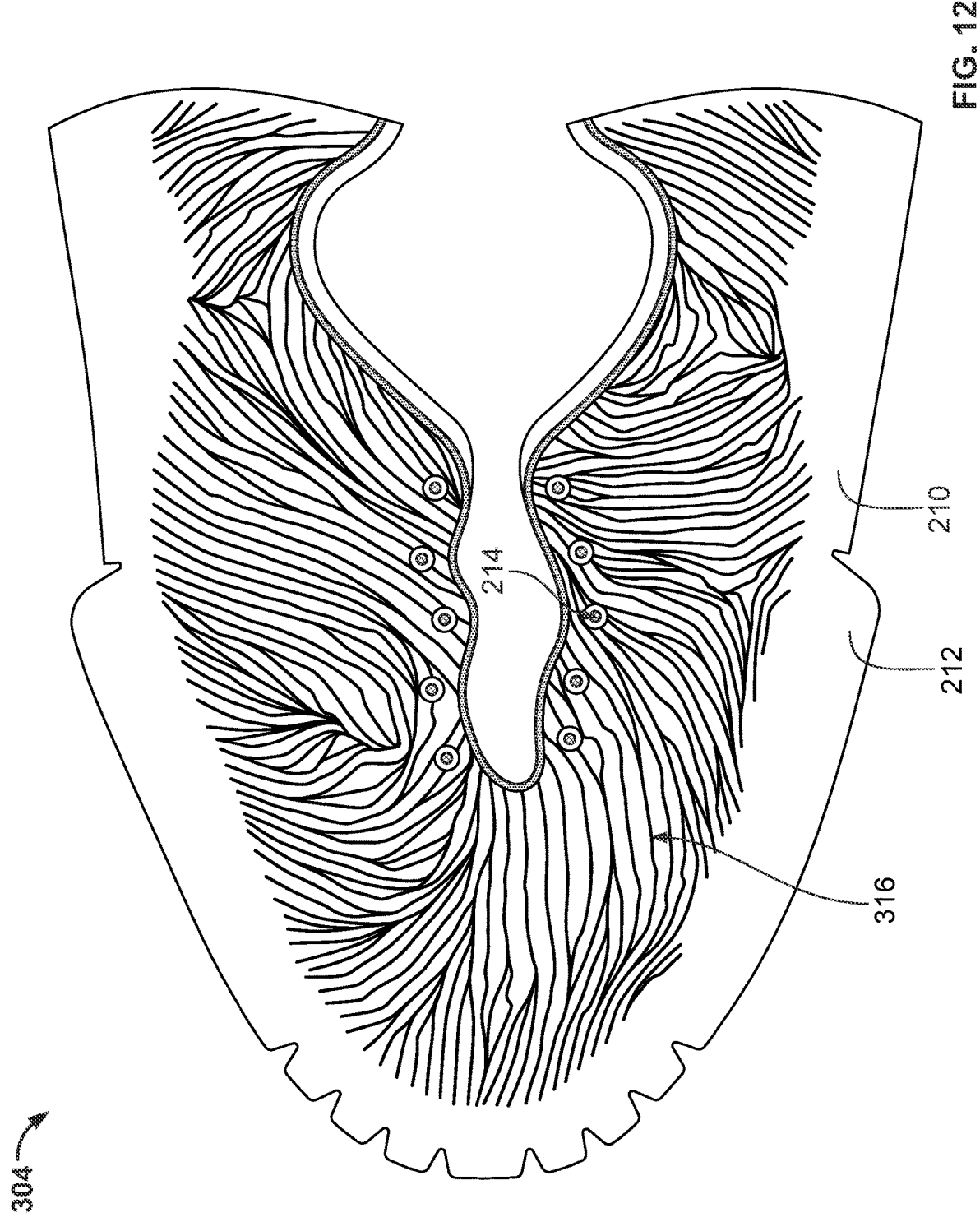
FIG. 12 illustrates a second example upper produced by the system of FIGS. 1 and 2.

With reference now to FIG. 12, a second example upper blank 304 includes the first substrate 210 and is a pre-made structure ready for 3D printing. The upper blank 304 further includes a plurality of reinforcements 316 applied to the first substrate 210 by the 3D printer 118 (shown in FIGS. 1 and 2) according to the strain map 186 (shown in FIG. 7), in the same manner as with the first example upper blank 204 and the example tongue 206 (shown in FIG. 8). In some embodiments, the plurality of reinforcements 316 are resilient and/or are composed of an elastomer. In the example of FIG. 12, the plurality of reinforcements 316 are shaped as a plurality of lines.

Figure 13:
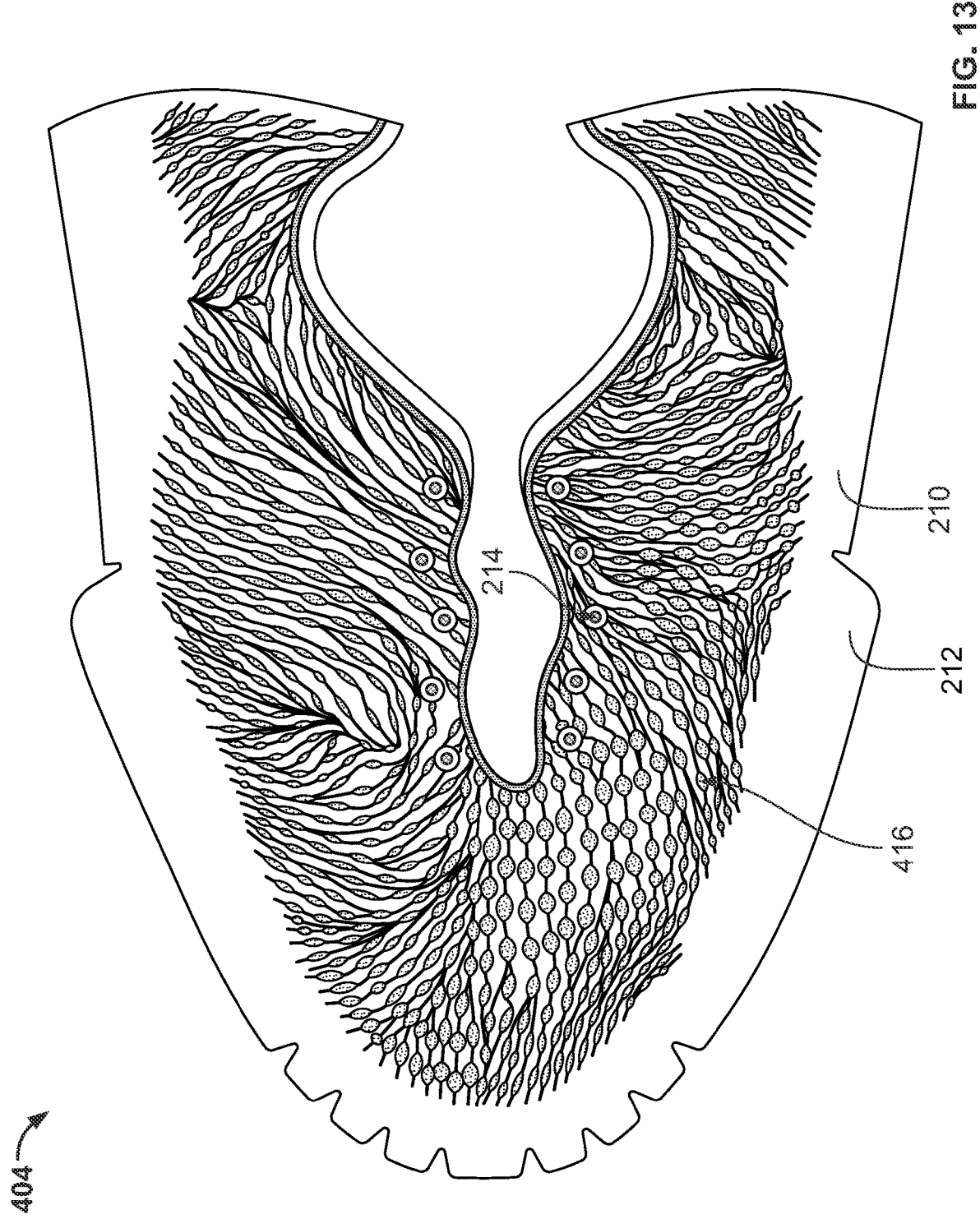
FIG. 13 illustrates a third example upper produced by the system of FIGS. 1 and 2.

Referring now to FIG. 13, a third example upper blank 404 includes the first substrate 210 and is a pre-made structure ready for 3D printing. The upper blank 404 further includes a plurality of reinforcements 416 applied to the first substrate 210 by the 3D printer 118 (shown in FIGS. 1 and 2) according to the strain map 186 (shown in FIG. 7), in the same manner as with the first example upper blank 204 and the example tongue 206 (shown in FIG. 8). In some embodiments, the plurality of reinforcements 416 are resilient and/or are composed of an elastomer. In the example of FIG. 13, the plurality of reinforcements 416 are shaped as a plurality of lines along which pointed dots are disposed.

Figure 14:
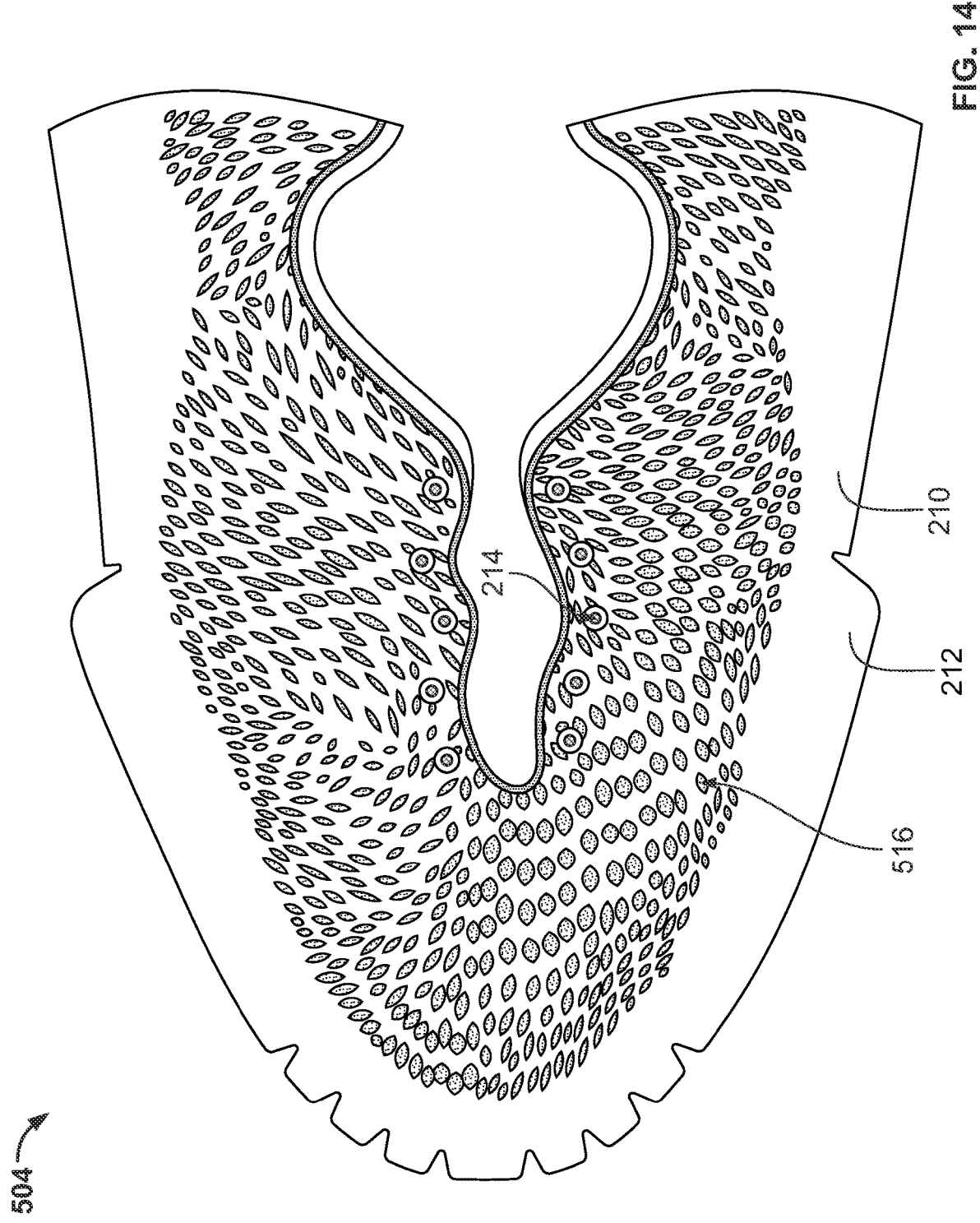
FIG. 14 illustrates a fourth example upper produced by the system of FIGS. 1 and 2.

With reference now to FIG. 14, a fourth example upper blank 504 includes the first substrate 210 and is a pre-made structure ready for 3D printing. The upper blank 504 further includes a plurality of reinforcements 516 applied to the first substrate 210 by the 3D printer 118 (shown in FIGS. 1 and 2) according to the strain map 186 (shown in FIG. 7), in the same manner as with the first example upper blank 204 and the example tongue 206 (shown in FIG. 8). In some embodiments, the plurality of reinforcements 516 are resilient and/or are composed of an elastomer. In the example of FIG. 14, the plurality of reinforcements 516 are shaped as a plurality of pointed dots.

Figure 15:
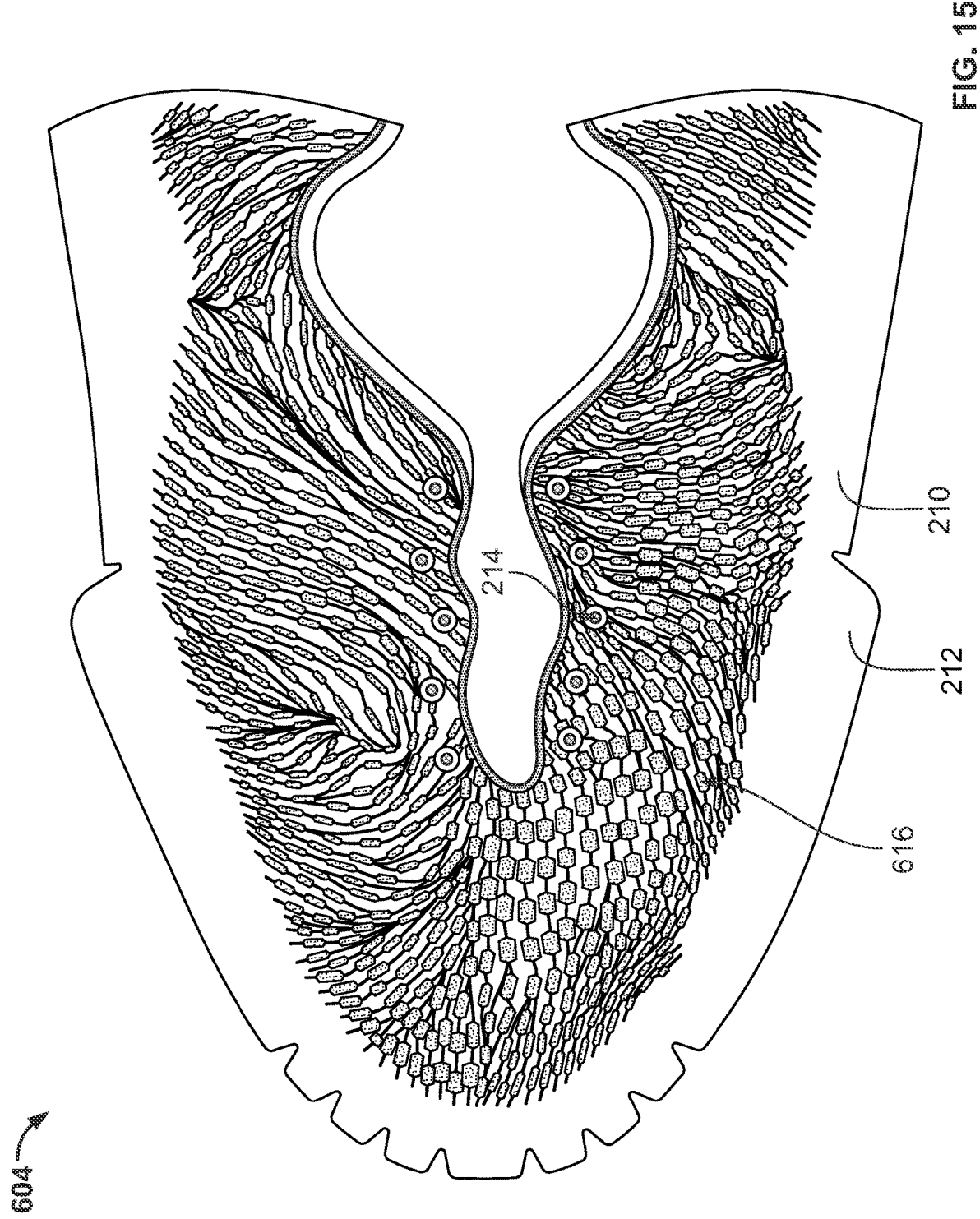
FIG. 15 illustrates a fifth example upper produced by the system of FIGS. 1 and 2.

Referring now to FIG. 15, a fifth example upper blank 604 includes the first substrate 210 and is a pre-made structure ready for 3D printing. The upper blank 604 further includes a plurality of reinforcements 616 applied to the first substrate 210 by the 3D printer 118 (shown in FIGS. 1 and 2) according to the strain map 186 (shown in FIG. 7), in the same manner as with the first example upper blank 204 and the example tongue 206 (shown in FIG. 8). In some embodiments, the plurality of reinforcements 616 are resilient and/or are composed of an elastomer. In the example of FIG. 15, the plurality of reinforcements 616 are shaped as a plurality of lines along which hexagons are disposed.

Figure 16:
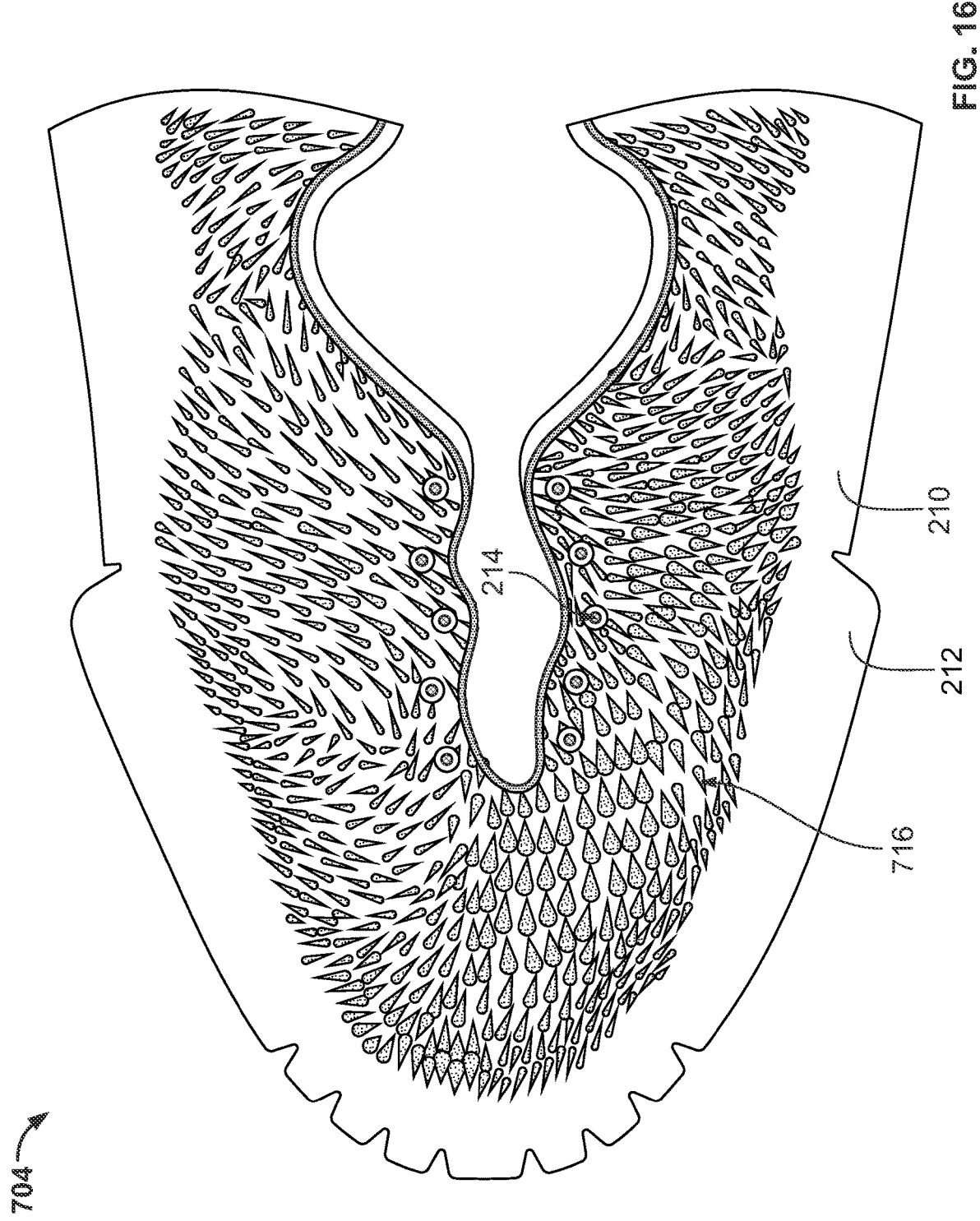
FIG. 16 illustrates a sixth example upper produced by the system of FIGS. 1 and 2.

With reference now to FIG. 16, a sixth example upper blank 704 includes the first substrate 210 and is a pre-made structure ready for 3D printing. The upper blank 704 further includes a plurality of reinforcements 716 applied to the first substrate 210 by the 3D printer 118 (shown in FIGS. 1 and 2) according to the strain map 186 (shown in FIG. 7), in the same manner as with the first example upper blank 204 and the example tongue 206 (shown in FIG. 8). In some embodiments, the plurality of reinforcements 716 are resilient and/or are composed of an elastomer. In the example of FIG. 16, the plurality of reinforcements 716 are shaped as a plurality of tear drops.

Figure 17:
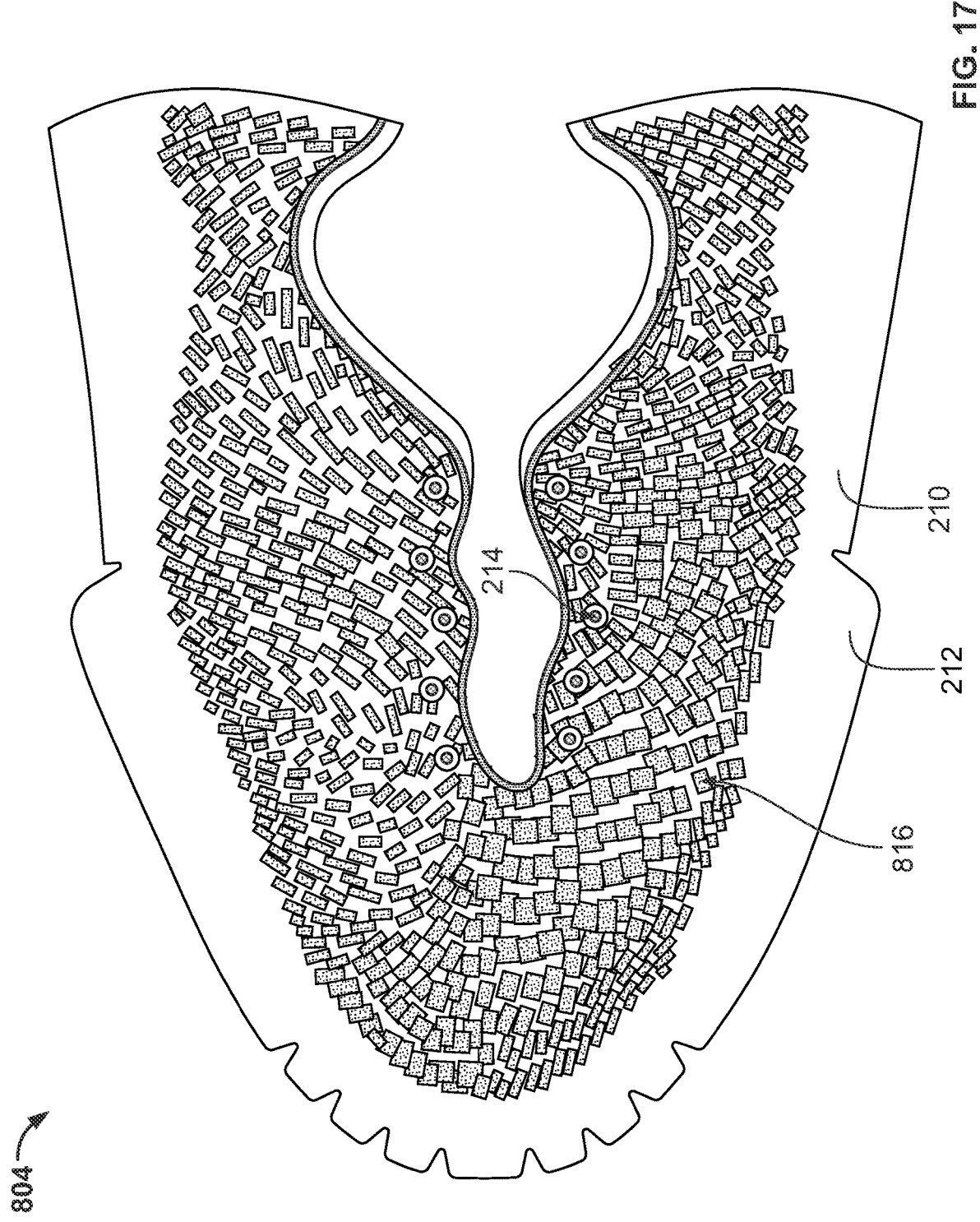
FIG. 17 illustrates a seventh example upper produced by the system of FIGS. 1 and 2.

Referring now to FIG. 17, a seventh example upper blank 804 includes the first substrate 210 and is a pre-made structure ready for 3D printing. The upper blank 804 further includes a plurality of reinforcements 816 applied to the first substrate 210 by the 3D printer 118 (shown in FIGS. 1 and 2) according to the strain map 186 (shown in FIG. 7), in the same manner as with the first example upper blank 204 and the example tongue 206 (shown in FIG. 8). In some embodiments, the plurality of reinforcements 816 are resilient and/or are composed of an elastomer. In the example of FIG. 17, the plurality of reinforcements 316 are shaped as a plurality of rectangles.

Figure 10:
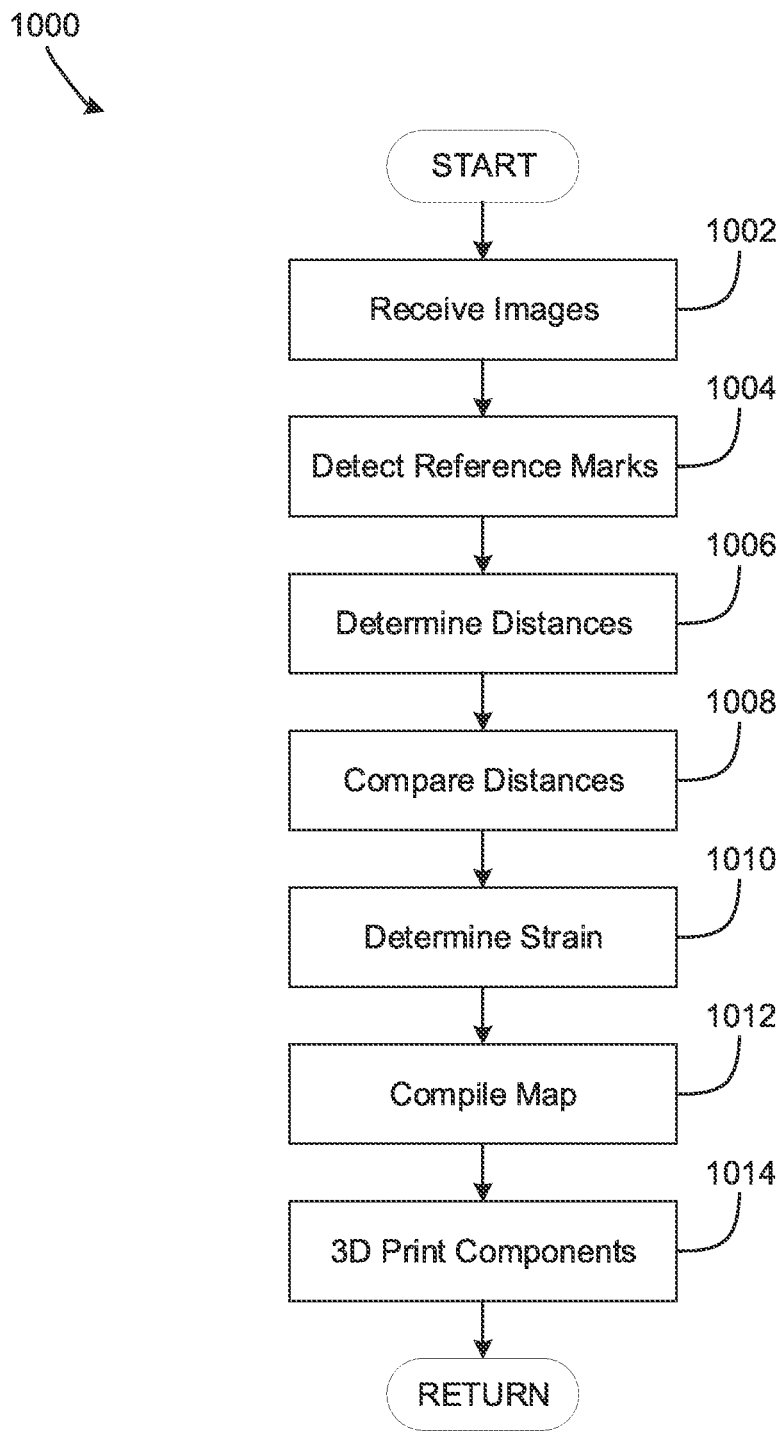
FIG. 10 is a flowchart representative of a method according to an embodiment of the present disclosure.

A flowchart representative of a first example method 1000 that may be performed to produce variably resilient elastomers is depicted in FIG. 10. The flowchart of FIG. 10 is representative of machine readable instructions that are stored in memory (such as the memory 134 of FIGS. 1-3) and include one or more programs which, when executed by a processor (such as the processor 132 of FIGS. 1-3), cause the controller 114 to operate the example system 100 of FIGS. 1 and 2. While the example program is described with reference to the flowchart illustrated in FIG. 10, many other methods of operating the example system 100 may alternatively be used. For example, the order of execution of the blocks may be rearranged, changed, eliminated, and/or combined to perform the method 1000. Further, because the method 1000 is disclosed in connection with the components of FIGS. 1 and 2, some functions of those components will not be described in detail below.

Initially, at block 1002, the controller 114 receives images from the cameras 110 (shown in FIGS. 1 and 2). More specifically, the image receiver 140 receives the calibration image 172 (shown in FIG. 4A) taken at the calibration time to and the first image 174 (shown in FIG. 5) taken at the first time $t_1$. In some embodiments, the image receiver 140 receives the first image 174 and the second image 176 (shown in FIG. 6) subsequently taken at the second time $t_2$.

In some embodiments, image receiver 140 receives the calibration image 172 taken at the calibration time to and the second image 176.

At block 1004, the controller 114 detects reference marks 170 (shown in FIGS. 4A, 5, and 6) in the images (e.g., the calibration image 172, the first image 174, the second image 176, etc.). More specifically, the reference detector 142 finds neighboring reference mark sets 184 and their corresponding regions 178.

At block 1006, the controller 114 determines distances across the regions 178. More specifically, the distance determiner 144 finds lengths between reference marks 170 (shown in FIGS. 4a, 5, and 6) of neighboring reference mark sets 184 in the images.

At block 1008, the controller 114 compares distances across the regions 178 between the images. More specifically, the distance comparator 146 determines length differences between the distances from the respective images corresponding to each region 178.

At block 1010, the controller 114 determines strain values e for each region 178. More specifically, the strain determiner 148 computes strain values e corresponding to each region 178 based on the determined length differences and the distances from the images.

At block 1012, the controller 114 compiles the strain map 186 (shown in FIG. 7). More specifically, the map compiler 150 positions strain indicators 196 on the upper guide 190 and the tongue guide 192 corresponding to each of the regions 178. The map compiler 150 assigns reinforcement thickness values 198 to each of the strain indicators 196 according to the reinforcement data 152 and the determined strain values e corresponding to the regions 178.

At block 1014, the 3D printer 118 (shown in FIGS. 1 and 2) additively manufactures the shoe components 200 (shown in FIG. 8). More specifically, the 3D printer 118 deposits and/or extrudes the first plurality of reinforcements 216 onto the first substrate 210 and the second plurality of reinforcements 226 onto the second substrate 222 according to the strain map 186 (shown in FIG. 7). The method 1000 then returns to block 1002.

From the foregoing, it will be appreciated that the above example system 100 includes cameras and a controller to measure strain in an athlete's shoes and generate a strain map of the shoes. The system 100 also includes a 3D printer to produce reinforced shoe components according to the strain map. Thus, the reinforced shoe components are customized to the athlete's feet. Because the shoe components are reinforced, the shoe components may be more durable as to existing athletic shoe components. Thus, the above-disclosed example system 100 conserves resources as compared to existing athletic shoe production systems.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

Variations and modifications of the foregoing are within the scope of the present disclosure. It is understood that the embodiments disclosed and defined herein extend to all alternative combinations of two or more of the individual features mentioned or evident from the text and/or drawings. All of these different combinations constitute various alternative aspects of the present disclosure. The claims are to be construed to include alternative embodiments to the extent permitted by the prior art.

To the extent used in the appended claims, the terms "including" and "in which" are used as the plain-English equivalents of the respective terms "comprising" and "wherein." Moreover, to the extent used in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

Various features of the disclosure are set forth in the following claims.

What is claimed is:

1. A system to produce a textile component of an article, comprising:
    a processor and memory configured to:
        determine a strain value in a region of the textile component of the article based on images of the article from a camera in selective communication with the processor and memory, and
        generate a strain map based on the strain value; and
    an additive manufacturing device in selective communication with the processor and memory and configured to apply a reinforcement to a textile substrate to variably reinforce the textile substrate according to the strain map and to form the textile component of the article.

2. The system of claim 1, wherein the article is a shoe and the textile component is an upper of the shoe.

3. The system of claim 2, wherein the textile substrate is a pre-made structure having a shape of the upper of the shoe.

4. The system of claim 2, wherein the textile substrate is formed of an elastomeric textile.

5. The system of claim 4, wherein the reinforcement is comprised of an elastomer.

6. The system of claim 1, wherein the article includes a first textile component and a second textile component.

7. The system of claim 6, wherein the article is a shoe, and
    wherein the first textile component is an upper of the shoe and the second textile component is a tongue of the shoe.

8. The system of claim 7, wherein the tongue is connected to the upper and the upper is connected to a sole of the shoe.

9. The system of claim 6, wherein the textile substrate includes a first textile substrate of the first textile component and a second textile substrate of the second textile component, and
    wherein the additive manufacturing device is further configured to:
        apply, according to the strain map, a first plurality of reinforcements to the first textile substrate to form the first textile component, and
        apply, according to the strain map, a second plurality of reinforcements to the second textile substrate to form the second textile component.

10. The system of claim 9, wherein the first textile substrate is a first pre-made structure having a shape of an upper of a shoe, and
    wherein the second textile substrate is a second pre-made structure having a shape of a tongue of the upper of the shoe.

11. The system of claim 10, wherein the first textile substrate includes a plurality of lace holes.

12. The system of claim 10, wherein the first textile substrate includes a seam flange.

13. The system of claim 10, wherein the second textile substrate includes a lace holder.

14. A system to produce an article, comprising:
a processor and memory configured to determine a strain value in a region of the article based on images of the article from a camera in selective communication with the processor and memory; and
an additive manufacturing device in selective communication with the processor and memory, the additive manufacturing device being configured to apply a reinforcement to an article substrate to variably reinforce at least the region of the article according to the strain values and to form the article.

15. The system of claim 14, wherein the article is an article of clothing.

16. The system of claim 14, wherein the reinforcement is comprised of an elastomer.

17. The system of claim 14, wherein the reinforcement includes a plurality of reinforcements applied to the article substrate.

18. The system of claim 17, wherein at least two of the plurality of reinforcements have a varying thickness relative to each other.

19. The system of claim 18, wherein the thickness of each of the plurality of reinforcements is in a range of about 0.5 millimeters to about 3.0 millimeters.

20. The system of claim 17, wherein the plurality of reinforcements are shaped as linear lines.

21. The system of claim 20, wherein two or more of the plurality of reinforcements have a varying length relative to each other.

22. The system of claim 17, wherein the plurality of reinforcements are shaped as curved lines.

23. The system of claim 22, wherein two or more of the plurality of reinforcements intersect each other.

24. The system of claim 17, wherein the plurality of reinforcements are shaped as dots.

25. The system of claim 24, wherein the plurality of reinforcements have a non-polygonal shape.

26. The system of claim 24, wherein the plurality of reinforcements have a polygonal shape.

27. The system of claim 24, wherein two or more of the plurality of reinforcements have varying shapes and sizes relative to each other.

28. A method to produce an article, comprising:
applying, with an additive manufacturing device, a reinforcement to an article substrate to variably reinforce at least a region of the article according to one or more strain values and to form the article,
wherein the strain values are determined based on images of the article.

29. The method of claim 28, wherein the reinforcement has a varying thickness.

30. The method of claim 28, wherein the reinforcement includes a plurality of reinforcements applied to the article substrate.

31. The method of claim 30, wherein two or more of the plurality of reinforcements have a varying thickness and a varying shape relative to each other.

32. The method of claim 28, wherein the article is a shoe and the article substrate is an upper of the shoe.

33. The method of claim 28, wherein the article is an article of clothing and the article substrate is a surface of the article of clothing.

34. A non-transitory computer-readable medium storing instructions for an additive manufacturing device that, when executed by the additive manufacturing device, causes the additive manufacturing device to:
apply a reinforcement to a substrate of an article to variably reinforce at least a region of the article according to one or more strain values and to form the article,
wherein the one or more strain values are determined based on images of the article.

35. The non-transitory computer-readable medium of claim 34, wherein the article is a shoe and the substrate of the article is an upper of the shoe.

36. The non-transitory computer-readable medium of claim 34, wherein the article is an article of clothing and the substrate of the article is a surface of the article of clothing.

37. The non-transitory computer-readable medium of claim 34, wherein the reinforcement is comprised of an elastomer.

* * * * *

UNITED STATES PATENT AND TRADEMARK OFFICE
CERTIFICATE OF CORRECTION

PATENT NO. : 12,020,422 B2
APPLICATION NO. : 17/862520
DATED : June 25, 2024
INVENTOR(S) : Christian Harig It is certified that error appears in the above-identified patent and that said Letters Patent is hereby corrected as shown below:

In the Specification

Column 6, Line 49, "to" should be --$t_0$--.

Column 6, Line 50, "to" should be --$t_0$--.

Column 6, Line 51, "to" should be --$t_0$--.

Column 6, Line 52, "to" should be --$t_0$--.

Column 7, Line 34, "to" should be --$t_0$--.

Column 10, Line 13, "Dz" should be --$D_2$--.

Column 10, Line 15, "Dz" should be --$D_2$--.

Column 10, Line 25, "Dz" should be --$D_2$--.

Column 10, Line 27, "Dz" should be --$D_2$--.

Column 12, Line 64, "to" should be --$t_0$--.

Column 13, Line 2, "to" should be --$t_0$--.

Signed and Sealed this
First Day of October, 2024

Katherine Kelly Vidal
*Director of the United States Patent and Trademark Office*